US012602053B2

(12) United States Patent
Suzuki

(10) Patent No.: US 12,602,053 B2
(45) Date of Patent: Apr. 14, 2026

(54) INFORMATION PROCESSING APPARATUS, MOVING BODY CONTROL SYSTEM, CONTROL METHOD, AND NON-TRANSITORY COMPUTER-READABLE MEDIUM

(71) Applicant: NEC Corporation, Tokyo (JP)

(72) Inventor: Takayuki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 370 days.

(21) Appl. No.: 18/265,475

(22) PCT Filed: Dec. 15, 2020

(86) PCT No.: PCT/JP2020/046632
§ 371 (c)(1),
(2) Date: Jun. 6, 2023

(87) PCT Pub. No.: WO2022/130476
PCT Pub. Date: Jun. 23, 2022

(65) Prior Publication Data
US 2024/0118707 A1 Apr. 11, 2024

(51) Int. Cl.
*G05D 1/24* (2024.01)
*G05D 1/243* (2024.01)
(Continued)

(52) U.S. Cl.
CPC ............. *G05D 1/2435* (2024.01); *G06T 7/70* (2017.01); *G06T 15/00* (2013.01);
(Continued)

(58) Field of Classification Search
CPC .... G05D 1/2435; G05D 2111/10; G06T 7/70; G06T 15/00; G06T 2207/30244; G06T 2207/30252
(Continued)

(56) References Cited

U.S. PATENT DOCUMENTS

2011/0243455 A1 10/2011 Miyajima
2016/0078288 A1* 3/2016 Takatani ................ G06V 40/25
382/103
(Continued)

FOREIGN PATENT DOCUMENTS

JP 2006-003263 A 1/2006
JP 2009-149194 A 7/2009
(Continued)

OTHER PUBLICATIONS

JP Office Action for JP Application No. 2022-569348, mailed on Aug. 6, 2024 with English Translation.
(Continued)

*Primary Examiner* — Mahmoud S Ismail
(74) *Attorney, Agent, or Firm* — Sughrue Mion, PLLC

(57) ABSTRACT

The information processing apparatus includes an extraction unit configured to extract at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region, an estimation unit configured to estimate a first photographing orientation of the first photographing apparatus, the first photographing apparatus photographing the first photographed image which is extracted, and a second photographing orientation of the second photographing apparatus at a time when the second photographed image is photographed, and a control unit configured to control an action of the moving apparatus based on the first photographing orientation and the second photographing orientation.

6 Claims, 10 Drawing Sheets

(51) Int. Cl.

| | | |
|---|---|---|
| *G06T 7/70* | (2017.01) |
| *G06T 15/00* | (2011.01) |
| *G05D 111/10* | (2024.01) |

(52) U.S. Cl.
CPC ...... *G05D 2111/10* (2024.01); *G06T 2207/30244* (2013.01); *G06T 2207/30252* (2013.01)

(58) Field of Classification Search
USPC .......................................................... 701/28
See application file for complete search history.

(56) References Cited

U.S. PATENT DOCUMENTS

| | | | |
|---|---|---|---|
| 2017/0291491 | A1 | 10/2017 | Kamitani et al. |
| 2017/0291492 | A1 | 10/2017 | Kamitani et al. |
| 2017/0292596 | A1 | 10/2017 | Kamitani et al. |
| 2020/0341470 | A1 | 10/2020 | Maeda et al. |
| 2021/0350576 | A1* | 11/2021 | Jiang ......................... G06T 7/97 |
| 2022/0333927 | A1* | 10/2022 | Rosenblum ........ G01C 21/3841 |
| 2023/0068001 | A1* | 3/2023 | Ali ....................... G08G 1/0175 |
| 2025/0067572 | A1* | 2/2025 | Taieb ....................... G06T 7/97 |

FOREIGN PATENT DOCUMENTS

| | | | |
|---|---|---|---|
| JP | 2011-215973 | A | 10/2011 |
| JP | 2015-036840 | A | 2/2015 |
| JP | 2016-061604 | A | 4/2016 |
| JP | 2017-107425 | A | 6/2017 |
| JP | 2017-187136 | A | 10/2017 |
| JP | 2019-125345 | A | 7/2019 |
| JP | 2019-132664 | A | 8/2019 |
| JP | 2019-159520 | A | 9/2019 |
| JP | 2020-166702 | A | 10/2020 |
| WO | 2013/069147 | A1 | 5/2013 |
| WO | 2019/026761 | A1 | 2/2019 |
| WO | 2019/176083 | A1 | 9/2019 |

OTHER PUBLICATIONS

International Search Report for PCT Application No. PCT/JP2020/046632, mailed on Mar. 16, 2021.
JP Office Action for JP Application No. 2022-569348, mailed on Feb. 4, 2025 with English Translation.
JP Official Communication for JP Application No. 2022-569348, mailed on Jun. 24, 2025 with English Translation.

\* cited by examiner

PHOTOGRAPHED IMAGE USED FOR
GENERATING ENVIRONMENTAL MAP

PHOTOGRAPHED IMAGE PHOTOGRAPHED
DURING MOVEMENT OF MOVING
ROBOT 30

PHOTOGRAPHED IMAGE USED FOR
GENERATING ENVIRONMENTAL MAP

PHOTOGRAPHED IMAGE PHOTOGRAPHED
DURING MOVEMENT OF
MOVING ROBOT 30

PHOTOGRAPHED IMAGE USED FOR
GENERATING ENVIRONMENTAL MAP

PHOTOGRAPHED IMAGE PHOTOGRAPHED
DURING MOVEMENT OF
MOVING ROBOT 30

INFORMATION PROCESSING APPARATUS, MOVING BODY CONTROL SYSTEM, CONTROL METHOD, AND NON-TRANSITORY COMPUTER-READABLE MEDIUM

This application is a National Stage Entry of PCT/JP2020/046632 filed on Dec. 15, 2020, the contents of all of which are incorporated herein by reference, in their entirety.

TECHNICAL FIELD

The present disclosure relates to an information processing apparatus, a moving body control system, a control method, a program, and so forth.

BACKGROUND ART

In recent years, labor shortage in a field of logistics has become serious. Thus, it has been desired that man-power saving and no-man operation in the field of logistics be achieved by conveyance of conveyed articles by using moving robots such as an autonomously moving forklift and an AGV (automatic guided vehicle). In no-man operation or the like using the moving robot, the moving robot has to perform own position estimation.

Patent Literature 1 discloses a configuration of an autonomous moving apparatus which edits a map created by using a SLAM method in a case where it is determined that a difference between an own apparatus position obtained from odometry and an own apparatus position estimated by using the SLAM (simultaneous localization and mapping) method exceeds an error range defined in advance.

CITATION LIST

Patent Literature

Patent Literature 1: Japanese Unexamined Patent Application Publication No. 2017-107425

SUMMARY OF INVENTION

Technical Problem

However, when an autonomous moving apparatus disclosed in Patent Literature 1 determines that a deviation of an estimated own apparatus position exceeds an error range defined in advance, the autonomous moving apparatus travels largely off a route defined in advance. In such a case, there is a possibility that the autonomous moving apparatus causes a collision or the like with another object. In other words, there is a problem that the autonomous moving apparatus disclosed in Patent Literature 1 may not in advance prevent an accident such as a collision.

One object of the present disclosure is to provide an information processing apparatus, a moving body control system, a control method, a program, and so forth which can in advance prevent an accident such as a collision.

Solution to Problem

An information processing apparatus according to a first aspect of the present disclosure includes: an extraction unit configured to extract at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region; an estimation unit configured to estimate a first photographing orientation of the first photographing apparatus, the first photographing apparatus photographing the first photographed image which is extracted, and a second photographing orientation of the second photographing apparatus at a time when the second photographed image is photographed; and a control unit configured to control an action of the moving apparatus based on the first photographing orientation and the second photographing orientation.

A moving body control system according to a second aspect of the present disclosure includes: a moving apparatus configured to autonomously move in a predetermined region; and a remote control apparatus having an extraction unit configured to extract at least one first photographed image, the first photographed image being similar to a second photographed image which is photographed by using a second photographing apparatus mounted on the moving apparatus, the moving apparatus being moving in the predetermined region, from a plurality of first photographed images which are photographed by using a first photographing apparatus for creating a three-dimensional image of the predetermined region, an estimation unit configured to estimate a first photographing orientation of the first photographing apparatus, the first photographing apparatus photographing the first photographed image which is extracted, and a second photographing orientation of the second photographing apparatus at a time when the second photographed image is photographed, and a control unit configured to decide an action of the moving apparatus based on the first photographing orientation and the second photographing orientation, and the moving apparatus acts based on an action instruction which is obtained from the remote control apparatus via a network.

A control method according to a third aspect of the present disclosure is executed in an information processing apparatus and includes: extracting at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region; estimating a first photographing orientation of the first photographing apparatus, the first photographing apparatus photographing the first photographed image which is extracted, and a second photographing orientation of the second photographing apparatus at a time when the second photographed image is photographed; and controlling an action of the moving apparatus based on the first photographing orientation and the second photographing orientation.

A program according to a fourth aspect of the present disclosure causes a computer to execute: extracting at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region; estimating a first photographing orientation of the first photographing apparatus, the first photographing apparatus photographing the first photographed image which is extracted, and a second photographing orientation of the second photographing apparatus at a time when the second photographed image is photographed; and controlling an action of the moving apparatus based on the first photographing orientation and the second photographing orientation.

Advantageous Effects of Invention

The present disclosure can provide an information processing apparatus, a moving body control system, a control method, a program, and so forth which can in advance prevent an accident such as a collision.

EXAMPLE EMBODIMENTS

First Example Embodiment

Figure 1:
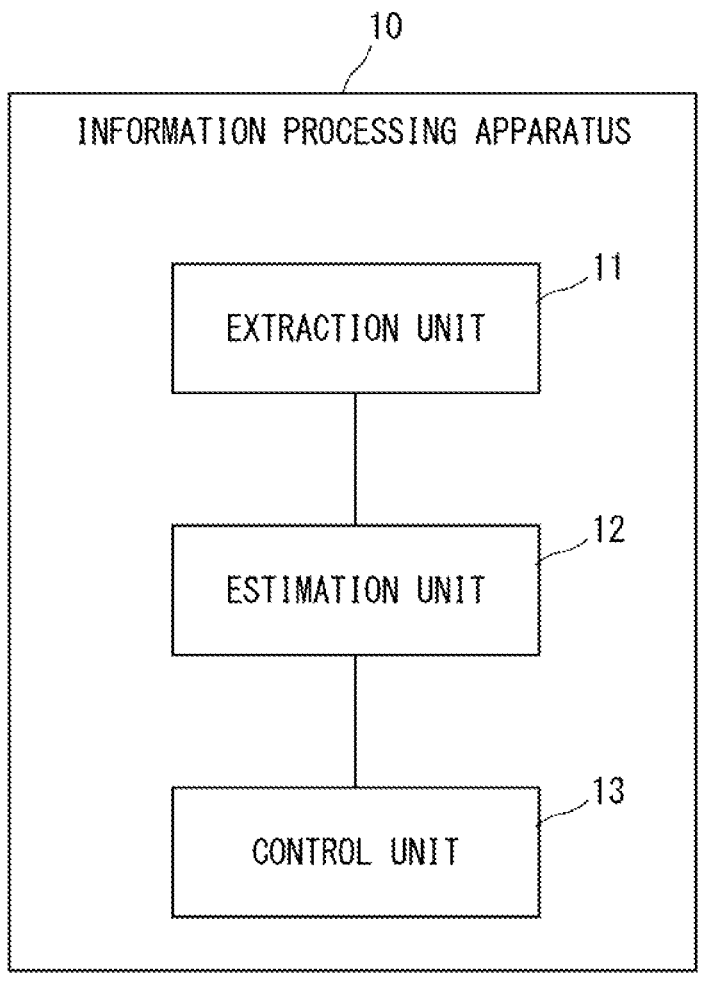
FIG. 1 is a configuration diagram of an information processing apparatus according to a first example embodiment.

Example embodiments of the present invention will hereinafter be described with reference to drawings. A configuration example of the information processing apparatus 10 according to a first example embodiment will be described by using FIG. 1. The information processing apparatus 10 may be a computer apparatus which acts by execution of a program stored in a memory by a processor. The information processing apparatus 10 has an extraction unit 11, an estimation unit 12, and a control unit 13. Each of configuration elements of the information processing apparatus 10 such as the extraction unit 11, the estimation unit 12, and the control unit 13 may be software or a module in which the processor executes a program stored in the memory and a process is thereby executed. Alternatively, the configuration element of the information processing apparatus 10 may be hardware such as a chip or a circuit.

The extraction unit 11 extracts at least one image from a plurality of first photographed images which are photographed by using a first photographing apparatus for creating a three-dimensional image of a predetermined region. Specifically, the extraction unit 11 extracts at least one first photographed image which is similar to a second photographed image photographed by using a second photographing apparatus mounted on a moving apparatus which is moving in the predetermined region.

The predetermined region may be a predetermined space or may be a space including a place, in which the moving apparatus moves, such as an inside of a building or an inside of a factory, for example. The first photographing apparatus may be a camera which generates an RGB (red, green, blue) image, for example or may be a camera which is mounted on a mobile terminal such as a smartphone, for example. The second photographing apparatus may be a camera which is mounted on the moving apparatus and generates an RGB image. The moving apparatus may be a vehicle or may be an autonomously moving forklift, an AGV (automatic guided vehicle), or the like, for example. The moving apparatus which autonomously moves may be referred to as moving robot or simply as robot.

Further, as the second photographing apparatus, the first photographing apparatus may be used. In other words, as the second photographing apparatus, the first photographing apparatus may be used, or a photographing apparatus different from the first photographing apparatus may be used.

The three-dimensional image is an image which specifies a three-dimensional position of a target object present in the predetermined region. The three-dimensional image may be referred to as three-dimensional map, environmental map, or the like. The three-dimensional image may be generated by executing SfM (structure from motion) by using a plurality of images photographed by the first photographing apparatus, for example. The SfM calculates all feature points of a series of two-dimensional images (or frames) which have already been gained and estimates matching feature points from a plurality of images which are obtained earlier and later in time. In addition, the SfM highly precisely estimates a three-dimensional position or an orientation of the camera which photographs each of the frames based on a difference in a position on a two-dimensional plane in the frame where each of the feature points appears. The three-dimensional image may be generated in the information processing apparatus 10 or may be generated in a computer apparatus different from the information processing apparatus 10. The information processing apparatus 10 may receive a three-dimensional image of the predetermined region, which is generated in another computer apparatus, via a network.

The extraction unit 11 compares the second photographed image, which is photographed by using the second photographing apparatus mounted on the moving apparatus which moves in the predetermined region, with each of the first photographed images which are used for generating the three-dimensional image and thereby makes a determination about similarity. The extraction unit 11 may extract the first photographed image which has the highest similarity to the second photographed image. Alternatively, the extraction unit 11 may extract two or more first photographed images in descending order of similarity to the second photographed image. The plurality of first photographed images which are used for generating the three-dimensional image may be stored in the memory or the like mounted on the information processing apparatus 10.

The estimation unit 12 estimates a photographing orientation of the first photographing apparatus which photographs the first photographed image extracted by the extraction unit 11. In addition, the estimation unit 12 estimates a photographing orientation of the second photographing apparatus which photographs the second photographed image, the second photographed image being similar to the extracted first photographed image. For example, based on a difference in the position among each of the feature points that appear in the plurality of first photographed images which are obtained earlier and later in time, the estimation unit 12 estimates the orientation of the first photographing apparatus. Similarly, based on a difference in the position among each of the feature points that appear in the plurality of second photographed images which are obtained earlier and later in time, the estimation unit 12 estimates the orientation of the second photographing apparatus. Further, as for the orientation of the first photographing apparatus, the estimation unit 12 may use information about the orientation of the first photographing apparatus, which is in advance estimated when the three-dimensional image is generated, as estimation information of the orientation of the first photographing apparatus. In other words, the estimation unit 12 may estimate the orientation of the photographing apparatus of the first photographing apparatus when the orientation of the second photographing apparatus is estimated or may use the orientation of the photographing apparatus of the first photographing apparatus, which is in advance estimated, as estimation information.

The photographing orientation may include a photographing position and a photographing direction of each of the photographing apparatuses, for example. The photographing direction may represent a bearing in which the photographing apparatus is directed with the photographing apparatus of the photographing apparatus being the origin.

The control unit 13 controls an action of the moving apparatus based on the photographing orientation of the first photographing apparatus and the photographing orientation of the second photographing apparatus. Controlling the action of the moving apparatus may be controlling a speed of the moving apparatus or may be controlling warning information to be output from the moving apparatus, for example. Further, controlling the action of the moving apparatus may be changing a moving route of the moving apparatus.

Here, using FIG. 2 and FIG. 3, a description will be made about contents of an experiment which was conducted by the inventors when the contents of the present disclosure were discussed. The inventors conducted an experiment for investigating the relationship between an own position estimated by an offline process and an own position estimated in real time.

In this experiment, an environmental map indicating a predetermined region is in advance generated by using a plurality of photographed images. In addition, the own position is in real time estimated by using photographed images which were photographed during movement in the predetermined region. Further, the own position is estimated by a substantially similar procedure to a procedure which was used when the environmental map was in advance generated by using the photographed images which were photographed during the movement in the predetermined region. Estimation of the own position includes estimation of the orientation of the photographing apparatus, and specifically, together with estimation of the position of the photographing apparatus, estimation of the photographing direction of the photographing apparatus which photographed the photographed image is performed. Further, the estimation of the own position may include estimation of the three-dimensional position or generation of the environmental map.

Generation of the environmental map which is in advance executed and the estimation of the own position by using the substantially similar procedure to the procedure which was used when the environmental map was generated will be referred to as offline process. Further, the estimation of the own position which is executed in real time will be referred to as real-time process. In the real-time process, in order to reduce a processing load, for example, computation with a less computation amount than a computation amount of computation executed in the offline process is carried out. Further, the number of photographed images to be used for own position estimation in the real-time process is less than the number of photographed images to be used for generation of the environmental map or the own position estimation in the offline process. As a result, precision about the generation of the environmental map or the own position estimation in the offline process is higher than estimation precision about the own position in the real-time process. In the following, a description will be made while an estimation result of the own position in the offline process using the photographed images which were photographed during the movement in the predetermined region, in other words, the photographed images which were photographed in real time is set as a true value. The true value indicates that the estimation result is substantially the same as the actual value.

Figure 2:
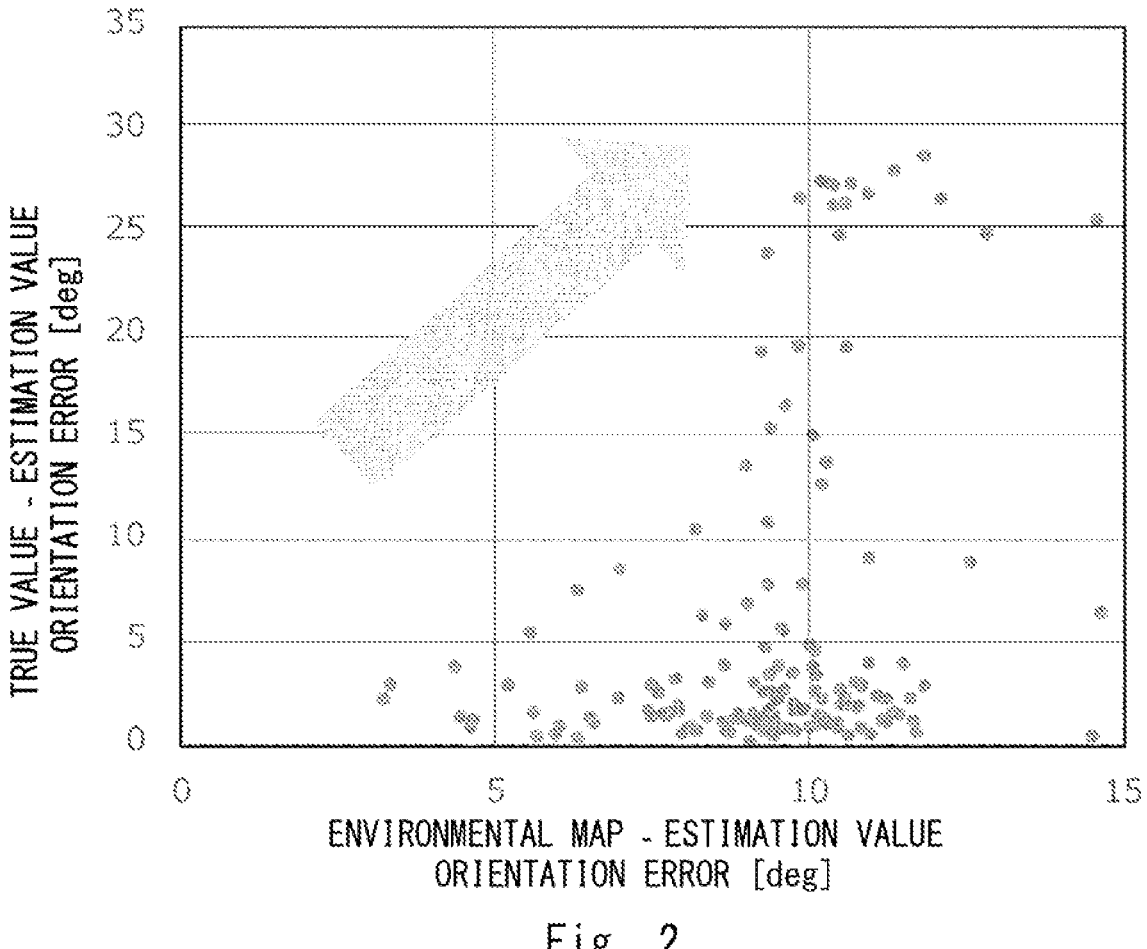
FIG. 2 is a diagram illustrating experiment results about own position estimation according to the first example embodiment.

The horizontal axis of FIG. 2 represents a difference between a value of the orientation of the photographing apparatus that photographed the photographed image which was used when the environmental map was generated and an estimation value of the orientation of the photographing apparatus which photographed the photographed image in the real-time process. In addition, the vertical axis of FIG. 2 represents a difference between a true value of the orientation in the offline process in which the photographed image was used, the photographed image being photographed in real time, and an estimation value of the orientation which was estimated in the real-time process. Here, the orientation is intended to mainly mean the direction in which the photographing apparatus is directed. FIG. 2 illustrates the relationship between the difference between the orientation of the photographing apparatus which was used when the environmental map was generated and the orientation of the photographing apparatus which was estimated in the real-time process and the difference between the true value of the orientation in the offline process and the estimation value of the orientation which was estimated in the real-time process.

FIG. 2 illustrates that as the difference represented by the horizontal axis increases, the difference between the true value of the orientation in the offline process and the estimation value of the orientation which was estimated in the real-time process increases. In other words, FIG. 2 illustrates that the possibility is high that as the difference represented by the horizontal axis becomes larger, precision of the estimation value of the orientation which is estimated in the real-time process is degraded.

Figure 3:
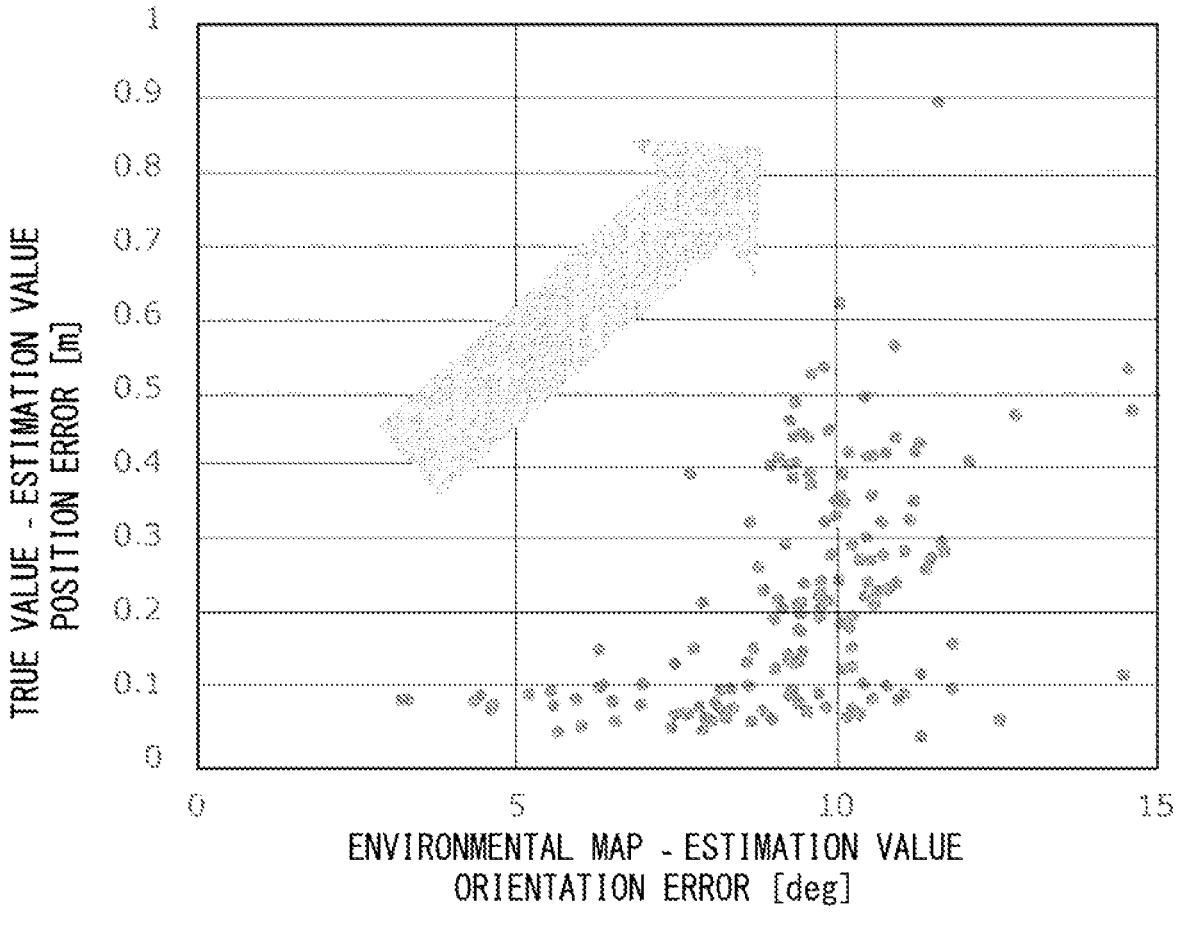
FIG. 3 is a diagram illustrating experiment results about the own position estimation according to the first example embodiment.

The horizontal axis of FIG. 3 represents a difference between a value of the orientation of the photographing apparatus that photographed the photographed image which was used when the environmental map was generated and an estimation value of the orientation of the photographing apparatus which photographed the photographed image in the real-time process. In addition, the vertical axis of FIG. 3 represents a difference between a true value of the position of the photographing apparatus which was photographed in real time and an estimation value of the position which was estimated in the real-time process. Here, the orientation is intended to mainly mean the direction in which the photographing apparatus is directed. FIG. 3 illustrates the relationship between the difference between the value of the position of the photographing apparatus which was used when the environmental map was generated and the estimation value of the position of the photographing apparatus which was estimated in the real-time process and the difference between the true value of the position in the offline process and the estimation value of the position which was estimated in the real-time process.

FIG. 3 illustrates that as the difference represented by the horizontal axis increases, the difference between the true value of the position in the offline process and the estimation value of the position which was estimated in the real-time process increases. In other words, FIG. 3 illustrates that the possibility is high that as the difference represented by the horizontal axis becomes larger, precision of the estimation value of the position which is estimated in the real-time process is degraded.

Based on the above experiment results, the inventors who have discussed the contents of the present disclosure have found necessity of control of the moving apparatus, the control corresponding to the difference between the orientation of the camera which photographed the image used for generation of the environmental map and the orientation of the camera in the real-time process.

Specifically, it has to be taken into consideration that when the action of the moving apparatus is controlled, as the difference between the orientations of the cameras in the offline process and the real-time process becomes larger, own position estimation precision in the real-time process is degraded. Accordingly, the inventors of the present disclosure have found that action control in consideration of safety of the moving apparatus is executed in accordance with the difference between the orientations.

The information processing apparatus 10 in FIG. 1 estimates the difference between the value of the orientation of the photographing apparatus which photographed the photographed image used for creating the three-dimensional image of the predetermined region and the estimation value of the orientation of the photographing apparatus that photographed the photographed image which was photographed during movement in the predetermined region. In addition, the information processing apparatus 10 controls the action of the moving apparatus based on the estimation results. As a result, in a case where the possibility is high that the own position estimation precision of the moving apparatus is degraded, the information processing apparatus 10 can execute control in consideration of safety of the moving apparatus.

Further, as the control in consideration of safety, the information processing apparatus 10 may cause the moving apparatus to output a warning. Accordingly, another moving apparatus which recognizes the moving apparatus having output the warning can behave so as to avoid the moving apparatus having output the warning. Further, as the control in consideration of safety, the information processing apparatus 10 may control the action of the moving apparatus and may send a notification or a report to a manager or the like via the network.

Second Example Embodiment

Figure 4:
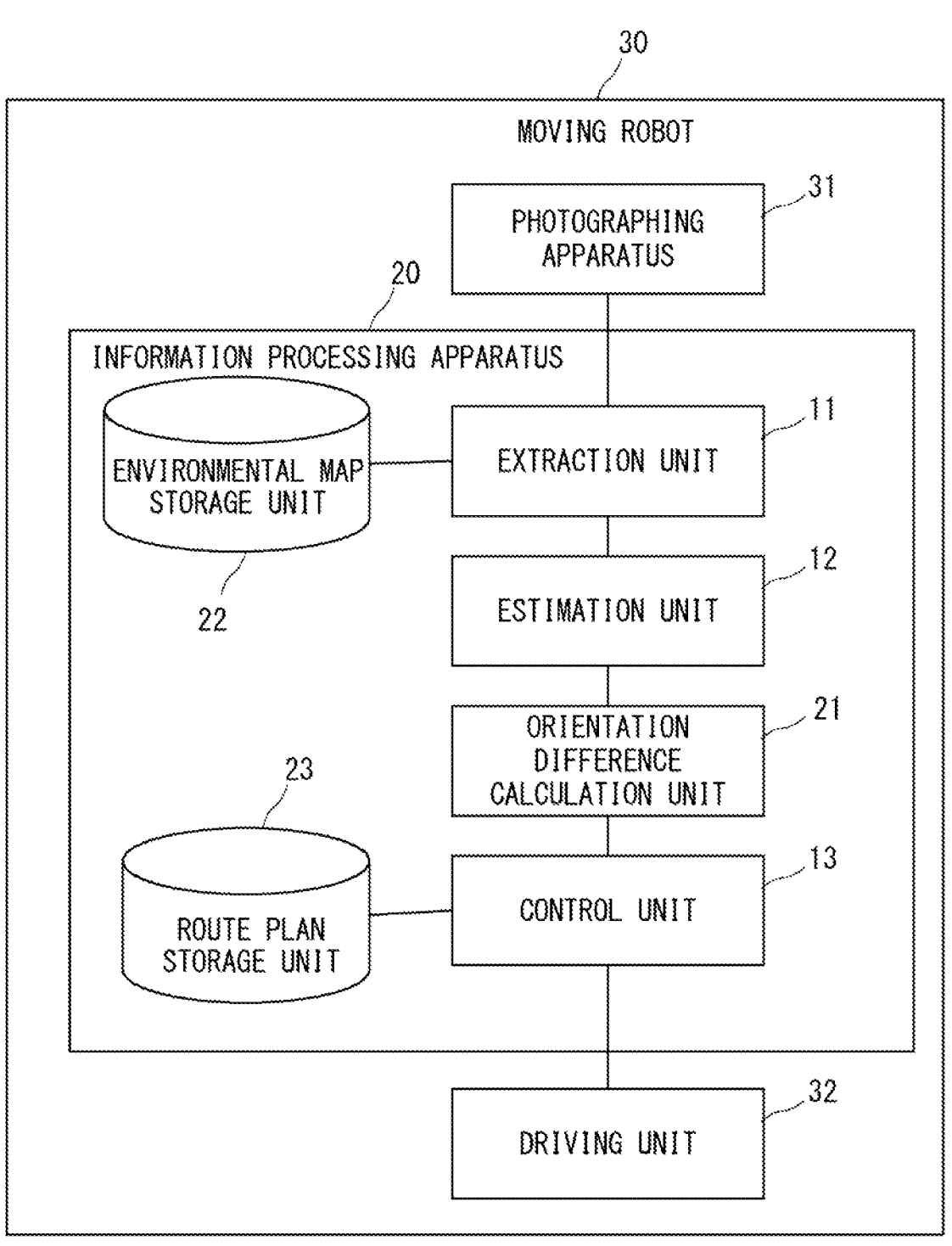
FIG. 4 is a configuration diagram of a moving robot according to a second example embodiment.

Next, a configuration example of a moving robot 30 according to a second example embodiment will be described by using FIG. 4. The moving robot 30 may be an autonomously moving forklift, an AGV, or the like. The moving robot 30 has an information processing apparatus 20, a photographing apparatus 31, and a driving unit 32.

The photographing apparatus 31 may be a camera which photographs an RGB image or an RGB-D (RGB and depth) image, for example. The photographing apparatus 31 photographs an environment around the moving robot while the moving robot 30 is moving. The photographing apparatus 31 outputs a photographed image which is photographed to the information processing apparatus 20.

The driving unit 32 may include tires of a vehicle and a peripheral device which causes the tires to act. The information processing apparatus 20 may be a computer apparatus similarly to the information processing apparatus 10 and controls an action of the driving unit 32. For example, the information processing apparatus 20 controls the driving unit 32 and may thereby change a direction in which the moving robot 30 moves or may thereby change a moving speed of the moving robot 30. Changing the moving speed of the moving robot includes stopping the moving robot 30.

Next, a configuration example of the information processing apparatus 20 will be described. The information processing apparatus 20 has a configuration in which to the information processing apparatus 10 in FIG. 1, an orientation difference calculation unit 21, an environmental map storage unit 22, and a route plan storage unit 23 are added. In the following description about the information processing apparatus 20, detailed descriptions about similar functions, actions, and so forth to those of the information processing apparatus will not be made.

The orientation difference calculation unit 21 may be software or a module in which the processor executes a program stored in the memory and a process is thereby executed. Alternatively, the orientation difference calculation unit 21 may be hardware such as a circuit or a chip. The environmental map storage unit 22 and the route plan storage unit 23 may be memories mounted on the information processing apparatus 20. Alternatively, the environmental map storage unit 22 and the route plan storage unit 23 may be removable external memories which are attached to the information processing apparatus 20.

The environmental map storage unit 22 stores an environmental map which is in advance generated. Further, the environmental map storage unit 22 also stores photographed images as two-dimensional images which are used for generating the environmental map as the three-dimensional image. In addition, the environmental map storage unit 22 stores information about the orientation of the photographing apparatus in photographing the two-dimensional image while associating the information with the photographing apparatus.

Being in advance generated may be being generated before the moving robot 30 starts moving, for example. The environmental map may be generated by using photographed images which are photographed by a camera mounted on a mobile terminal such as a smartphone. The environmental map may be generated in the information processing apparatus 20 or may be generated in another computer apparatus different from the information processing apparatus 20. The information about the orientation of the photographing apparatus includes information which indicates a position and a direction of the photographing apparatus at a time when the photographing apparatus photographs the photographed image, for example. The orientation of the photographing apparatus is estimated when the environmental map is generated by executing the SfM, for example. Further, when the environmental map is generated, a person who retains a smartphone or the like may photograph photographed images for generating the environmental map while moving along a route of the moving robot which is in advance defined. Accordingly, the photographed images to be used for generating the environmental map and the photographed images which are photographed by the photographing apparatus 31 while the moving robot 30 is moving are generated from similar visual points.

The extraction unit 11 extracts the photographed image, which is similar to the photographed image output from the photographing apparatus 31, among a plurality of photographed images stored in the environmental map storage unit 22. For example, the extraction unit 11 extracts feature points of each of the plurality of photographed images stored in the environmental map storage unit 22 and the photographed image output from the photographing apparatus 31 and may make a determination about the similarity of the images by using the feature points. For example, the feature points of each of the images may be extracted by using an algorithm such as SIFT, SURF, ORB, or AKAZE.

Figure 5:
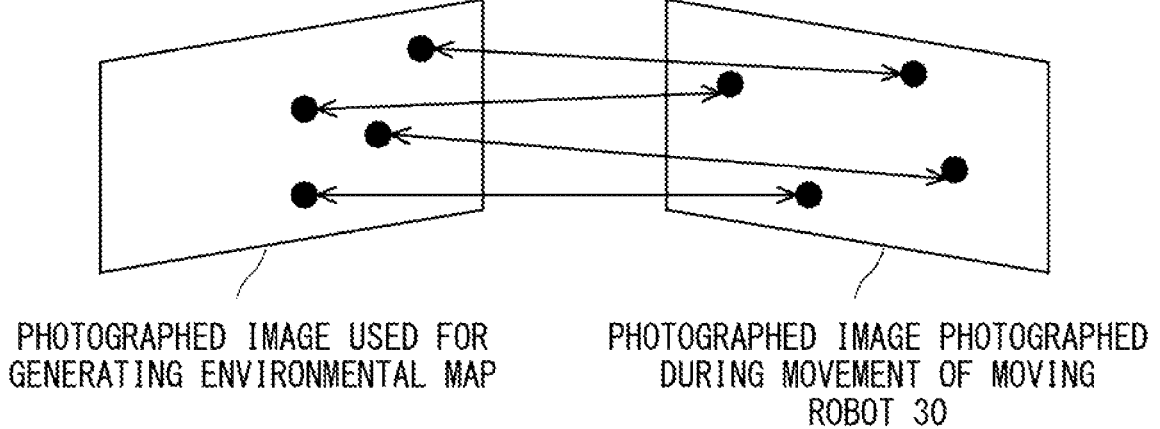
FIG. 5 is a diagram for explaining matches between feature points according to the second example embodiment.

For example, as illustrated in FIG. 5, the extraction unit 11 may cause the feature points of the photographed image stored in the environmental map storage unit 22 to match with the feature points of the photographed image output from the photographing apparatus 31 and may make a determination about the similarity in accordance with the number of matched feature points. For example, the extraction unit 11 may determine that the similarity of the photographed images is higher as the number of matched feature points is larger. For example, the extraction unit 11 may extract the most similar photographed image to the photographed image output from the photographing apparatus 31 from the environmental map storage unit 22 or may extract an arbitrary number of photographed images from the environmental map storage unit 22 in order of higher similarity. The extraction unit 11 outputs the photographed image which is extracted from the environmental map storage unit 22, information about the orientation of the photographing apparatus, the information being associated with the extracted photographed image, and the photographed image output from the photographing apparatus 31 to the estimation unit 12.

The estimation unit 12 estimates the orientation of the photographing apparatus 31 which photographs the accepted photographed image. For example, the estimation unit 12 executes VSALM (visual SLAM) by using a plurality of photographed images which are obtained earlier and later in time than the photographed image as a target of estimation of the orientation of the photographing apparatus 31. Accordingly, the estimation unit 12 estimates the orientation of the photographing apparatus 31 which photographs the photographed image as the target of estimation of the orientation. The estimation unit 12 outputs the information about the orientation of the photographing apparatus, the information being associated with the photographed image which is extracted from the environmental map storage unit 22, and information about the orientation of the photographing apparatus 31 which photographs the photographed image, the orientation being estimated in the estimation unit 12, to the orientation difference calculation unit 21.

The orientation difference calculation unit 21 calculates the difference between the orientation of the photographing apparatus which photographs the photographed image extracted from the environmental map storage unit 22 and the orientation of the photographing apparatus which photographs the photographed image output from the photographing apparatus 31. A description will be made, by using FIG. 6, about an orientation difference between the photographing apparatuses which is calculated by the orientation difference calculation unit 21.

Figure 6:
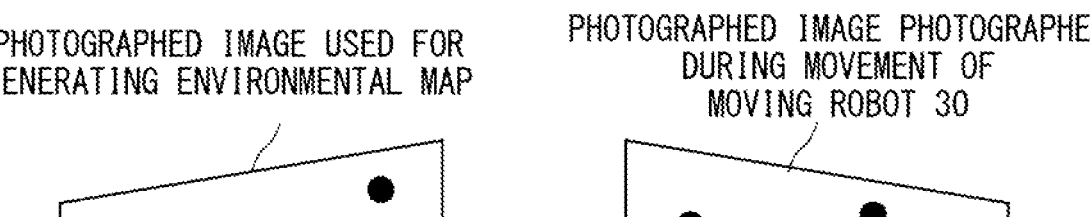
FIG. 6 is a diagram for explaining an orientation difference between photographing apparatuses according to the second example embodiment.
Figure 6:
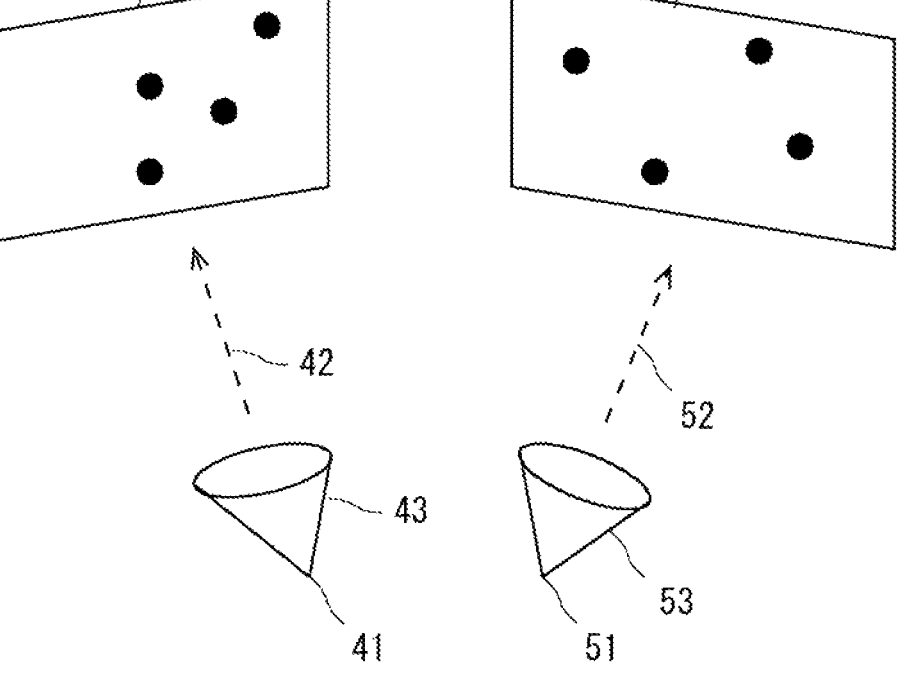
Figure 6:
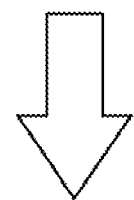
Figure 6:

As for FIG. 6, a description will be made on the assumption that the photographed images used for generating the environmental map are photographed by using a smartphone. It is assumed that a photographing spot 41 in FIG. 6 is set as a photographing spot where the smartphone performs photographing and a photographing direction 42 indicates a photographing direction of the smartphone. A viewing angle 43 indicates a viewing angle of a camera mounted on the smartphone. It is assumed that a photographing spot 51 is set as a photographing spot where the photographing apparatus 31 performs photographing and a photographing direction 52 indicates a photographing direction at a time when the photographing apparatus 31 photographs the photographed image. A viewing angle 53 indicates a viewing angle of the photographing apparatus 31. Points in the photographed images represent feature points of a target object.

A reference character r1 in FIG. 6 represents the difference in the orientation between the photographing apparatus 31 and the smartphone. Specifically, the orientation difference calculation unit 21 moves the photographing spot 41 to the photographing spot 51 while maintaining the photographing direction. The orientation difference calculation unit 21 sets the photographing spot 41 and the photographing spot 51, which agree with each other, as the origin and defines an angle, which is formed between the photographing direction 42 and the photographing direction 52, as r1.

Figure 7:
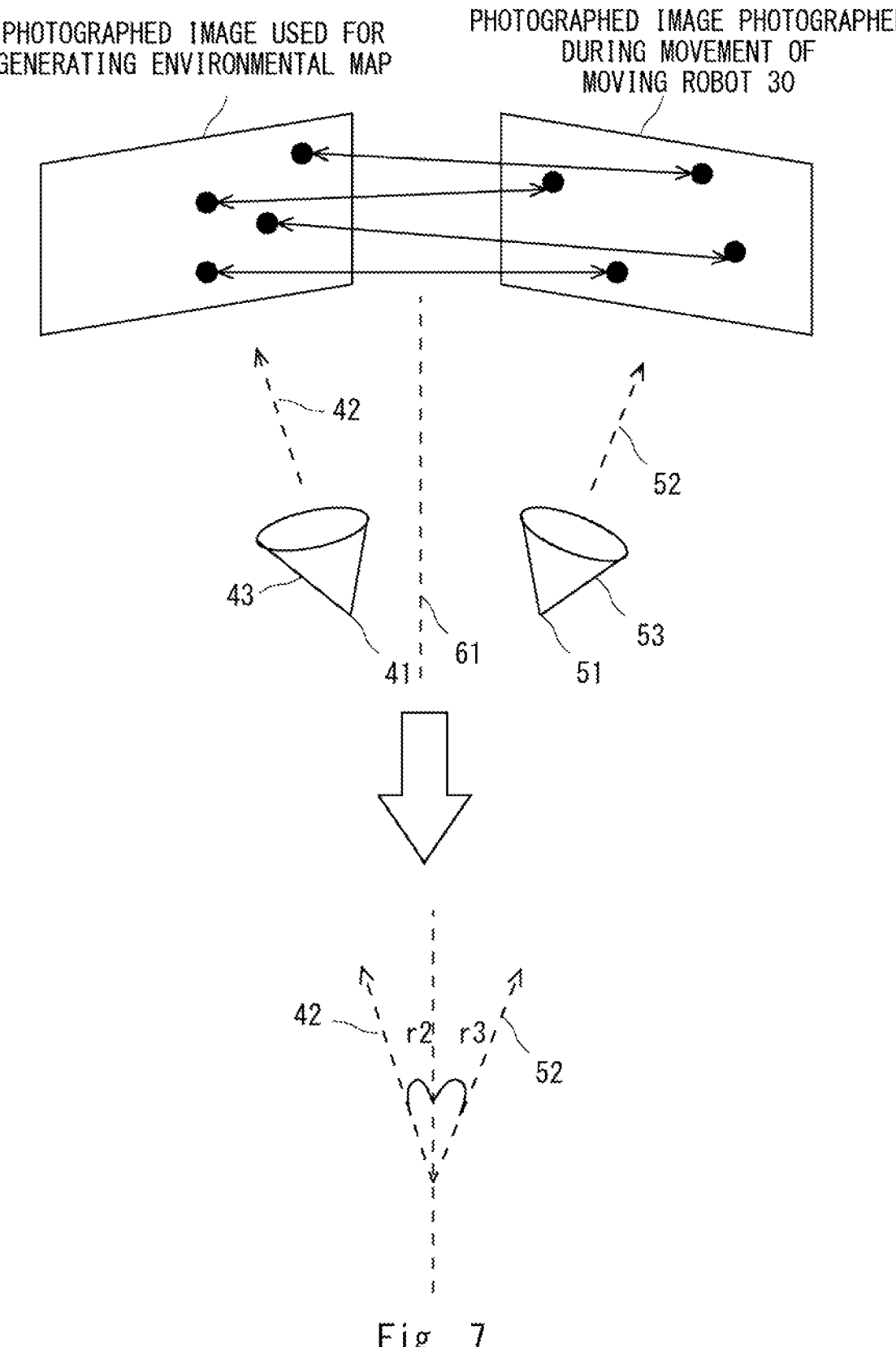
FIG. 7 is a diagram for explaining an orientation difference between the photographing apparatuses according to the second example embodiment.

As for the orientation difference of the photographing apparatus calculated by the orientation difference calculation unit 21, a different example from FIG. 6 will be described by using FIG. 7. In FIG. 7, a reference line 61 is indicated. The reference line 61 is a line which indicates a predetermined direction in a predetermined space. FIG. 7 illustrates that an angle formed between the reference line 61 and the photographing direction 42 is set as r2 and an angle formed between the reference line 61 and the photographing direction 52 is set as r3. The orientation difference calculation unit 21 may calculate r2±r3 or the like as the orientation difference, for example.

The control unit 13 controls the driving unit 32 based on the orientation difference calculated in the orientation difference calculation unit 21 and thereby changes the action of the moving robot 30. Specifically, the control unit 13 may change a route plan of the moving robot 30 which is in advance defined. For example, the route plan storage unit 23 stores a route plan that in advance defines a route in which the moving robot 30 progresses. The control unit 13 extracts information about the route plan from the route plan storage unit 23 and controls the driving unit 32 such that the moving robot 30 moves in accordance with the route plan. Here, in a case where the orientation difference exceeds a threshold value defined in advance, the control unit 13 may change the route plan stored in the route plan storage unit 23 and may control the driving unit 32 such that the moving robot 30 moves in accordance with the changed route plan. In a case where the orientation difference exceeds the threshold value defined in advance, there is a possibility that the distance between an estimated position of the moving robot 30 and an actual position is equivalent to or longer than a predetermined distance. Thus, for example, in a case where the orientation difference exceeds the threshold value defined in advance, the control unit 13 may change the route plan so as to narrow a moving range of the moving robot 30 taking into consideration safety of the moving robot 30.

Further, the control unit 13 may change a moving speed based on the orientation difference calculated in the orientation difference calculation unit 21. For example, in a case where the orientation difference exceeds the threshold value defined in advance, the control unit 13 may control the driving unit 32 such that the moving speed of the moving robot 30 becomes a lower speed or the moving robot 30 is stopped. Further, the control unit 13 may use a plurality of threshold values with different values and thereby control the driving unit 32 so as to change the moving speed to a lower speed as the orientation difference becomes larger, for example. Alternatively, in a case where the orientation difference does not exceed the threshold value defined in advance, the control unit 13 may control the driving unit 32 such that the moving speed of the moving robot 30 becomes a higher speed.

For example, the control unit 13 may transform the orientation difference calculated in the orientation difference calculation unit 21 into the moving speed of the moving robot 30 by using a step function, a sigmoid function, or another function. Further, in a case where a plurality of photographed images are extracted in the extraction unit 11 and where the number of photographed images in which the orientation differences from the photographing apparatus 31 exceed the threshold value exceeds a predetermined number, for example, the control unit 13 may perform control such as lowering the speed of the moving robot 30.

Figure 8:
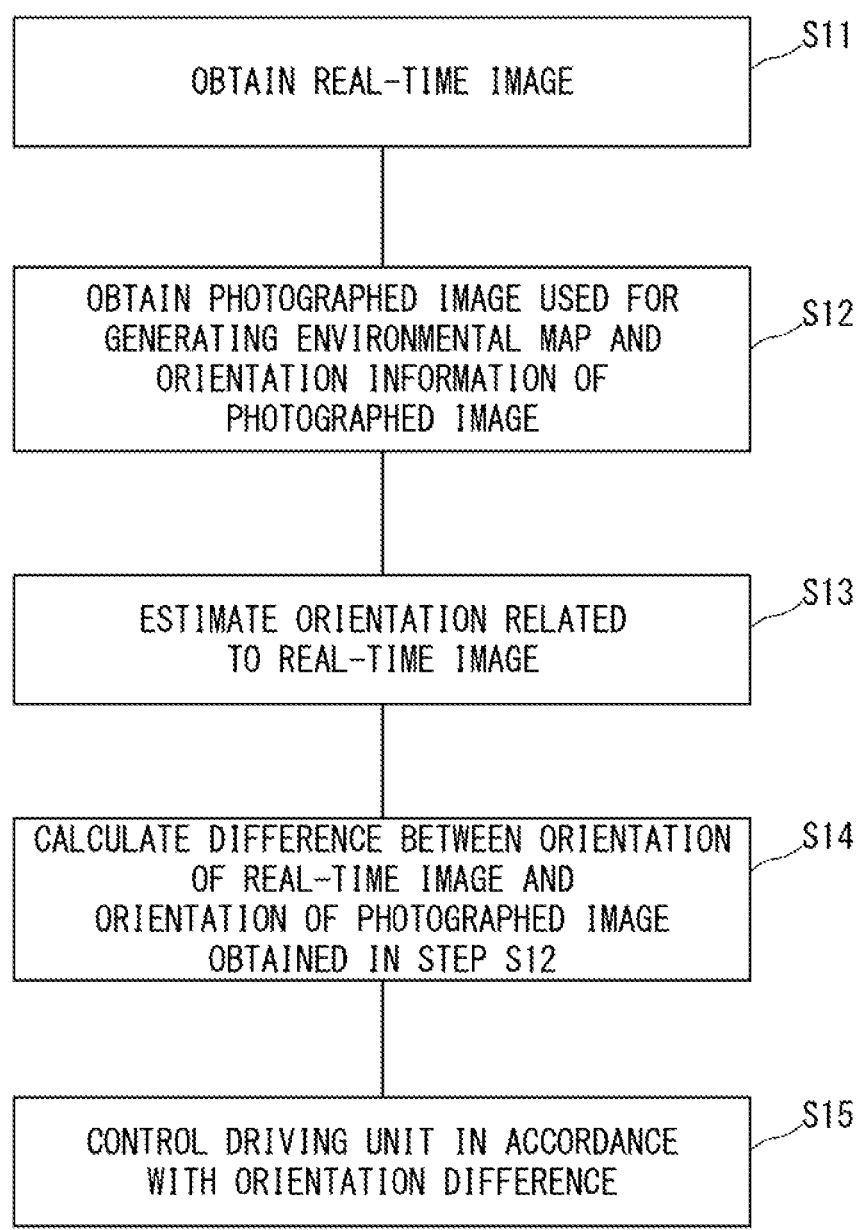
FIG. 8 is a diagram illustrating a flow of control of movement of the moving robot according to the second example embodiment.

Next, a flow of controlling movement of the moving robot 30 according to the second example embodiment will be described by using FIG. 8. First, the extraction unit 11 obtains a real-time image photographed by the photographing apparatus 31 (S11). The real-time image means a photographed image which is photographed by the photographing apparatus 31 during movement of the moving robot 30.

Next, the extraction unit 11 extracts or obtains the photographed image similar to the real-time image and orientation information of the photographing apparatus which photographs the above photographed image from the environmental map storage unit 22 (S12). The extraction unit 11 obtains at least one photographed image similar to the real-time image and obtains the orientation information which is associated with the obtained photographed image. The photographed image is a photographed image which is used for generating the environmental map.

Next, the estimation unit 12 estimates the orientation related to the real-time image (S13). Specifically, the estimation unit 12 estimates the position of the photographing apparatus 31 which photographs the real-time image and the direction in which the photographing apparatus 31 is directed.

Next, the orientation difference calculation unit 21 calculates the difference between the orientation of the photographing apparatus 31 which photographs the real-time image and the orientation which is associated with the photographed image obtained in step S12 (S14).

Next, the control unit 13 controls the driving unit 32 based on the orientation difference calculated in step S14 (S15). For example, the control unit 13 may perform control so as to decelerate the driving unit 32 as the orientation difference becomes larger and may stop the driving unit 32 in a case where the orientation difference exceeds a threshold value defined in advance. Alternatively, in a case where the orientation difference is less than the threshold value defined in advance, the control unit 13 may control the driving unit 32 such that the driving unit 32 is accelerated compared to its present state.

As described above, the moving robot 30 according to the second example embodiment can control the driving unit 32 in accordance with the difference between the orientation of the photographing apparatus 31 during the movement and the orientation of the photographing apparatus which photographs the photographed image used for generating the environmental map.

Here, as described by using FIG. 2 and FIG. 3, there is a possibility that as the difference between the orientation related to the real-time image and the orientation related to the photographed image used for generating the environmental map increases, the difference between a present position and the estimated position of the moving robot 30 also increases. Thus, the action is controlled in accordance with the orientation difference, and the moving robot 30 can thereby realize safe movement before the estimation value of the own position of the moving robot 30 is largely deviated.

Further, the following effects are provided by setting the speed of the moving robot 30 to a lower speed as the orientation difference increases. The moving robot 30 performs the own position estimation by using a plurality of real-time images which are photographed by the photographing apparatus 31 during the movement. In this case, when the moving speed of the moving robot is a low speed, an area in which the plurality of real-time images photographed by the photographing apparatus 31 overlap each other becomes larger. In other words, in a case where the moving speed of the moving robot 30 is a low speed, the number of feature points shared among the real-rime images becomes larger than that in a case where the moving speed is a high speed. This is because the moving speed of the moving robot 30 is a low speed, intervals among positions for photographing the real-time images thus become shorter than those in a case where the moving speed is a high speed, and the number of real-time images including the same target object can be increased.

As a result, the moving robot 30 can improve precision of the own position estimation by using the real-time images which are similar to each other. Accordingly, the moving robot 30 can more safely move.

Other Example Embodiment

Figure 9:
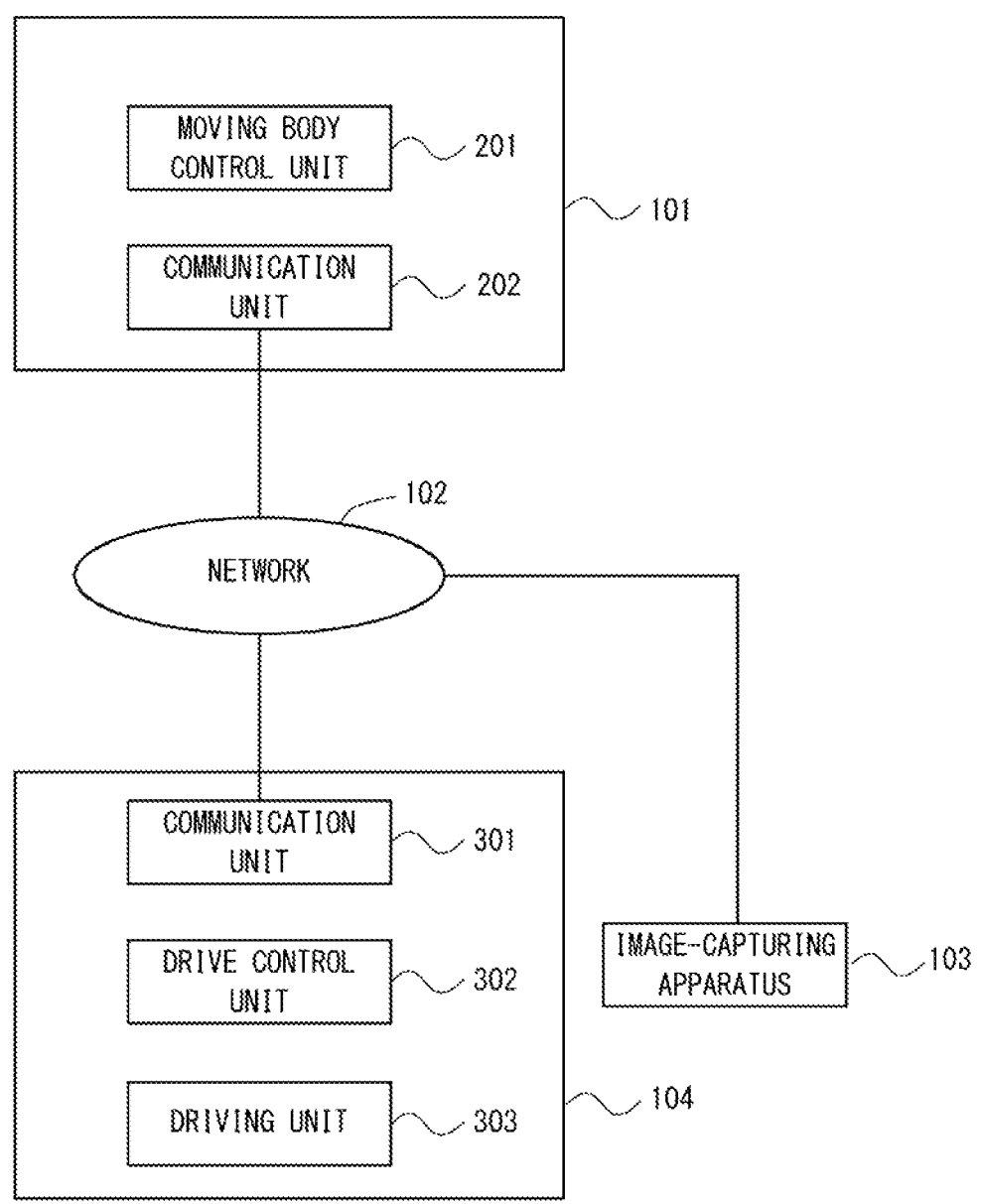
FIG. 9 is a configuration diagram of a moving body control system according to another example embodiment.

In another example embodiment, a description will be made about a general configuration of a moving body control system including the information processing apparatus 20 and a hardware resource for realizing the information processing apparatus 20. First, FIG. 9 illustrates a block diagram of the moving body control system according to the other example embodiment. Note that the moving body control system illustrated in FIG. 9 depicts a schematic block diagram of the system. FIG. 9 illustrates a configuration example of a system in which an apparatus corresponding to the information processing apparatus 20 in FIG. 4 remotely operates the moving robot 30.

The moving body control system illustrated in FIG. 9 has a remote control apparatus 101, a network 102, an image-capturing apparatus 103, and a moving body 104. The remote control apparatus 101 corresponds to the information processing apparatus 20. The image-capturing apparatus 103 corresponds to the photographing apparatus 31. The moving body 104 corresponds to the moving robot 30 from which the information processing apparatus 20 is removed. The remote control apparatus 101 has a moving body control unit 201 and a communication unit 202. The moving body control unit 201 corresponds to the control unit 13 which is described above. Further, the communication unit 202 is an interface by which the moving body control unit 201 communicates with the moving body 104 and the image-capturing apparatus 103.

The network 102 is a configuration part for performing mutual communication among the remote control apparatus 101, the image-capturing apparatus 103, and the moving body 104. The image-capturing apparatus 103 is a camera, for example.

The moving body 104 is the moving robot 30 as a control target, for example. The moving body 104 has a communication unit 301, a drive control unit 302, and a driving unit 303. The communication unit 301 is an interface by which the moving body 104 communicates with the remote control apparatus 101. The drive control unit 302 gives an action instruction to the driving unit 303 based on a first control input value which is given from the remote control apparatus 101. The driving unit 303 is a configuration part such as a motor which drives a driving wheel.

Figure 10:
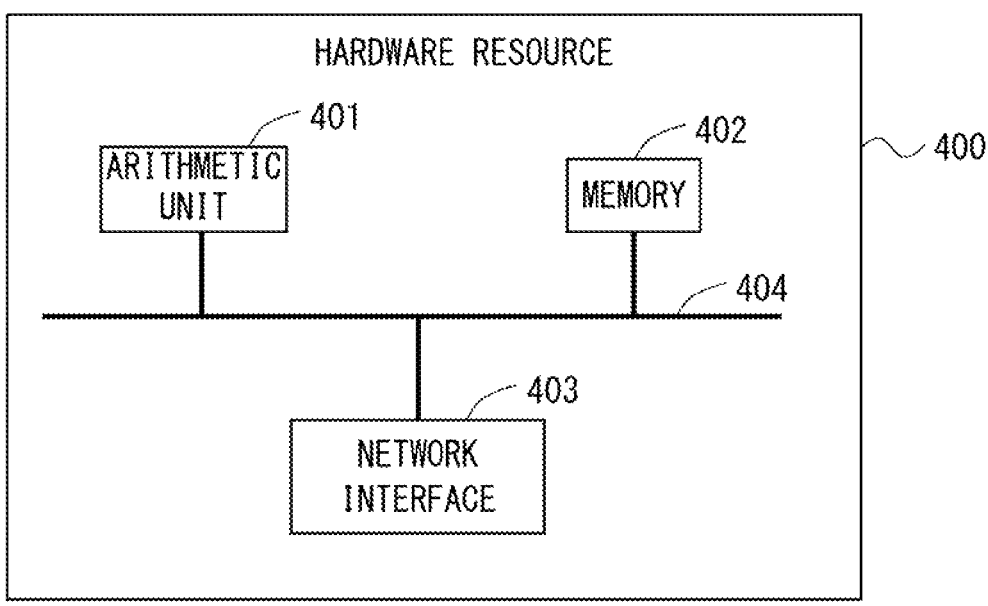
FIG. 10 is a configuration diagram of an information processing apparatus according to another example embodiment.

Next, a hardware resource configuring the information processing apparatus 20 will be described with reference to FIG. 10. FIG. 10 illustrates one example of the hardware resource, and the hardware resource may include another configuration part such as an input interface. In other words, a hardware resource 400 illustrated in FIG. 10 is not intended to limit the configuration illustrated in FIG. 10.

The hardware resource 400 can be configured with an information processing apparatus or a computer. In the example illustrated in FIG. 10, the hardware resource 400 includes an arithmetic unit 401, a memory 402, a network interface 403, and so forth which are mutually connected by an internal bus 404. The arithmetic unit 401 may be rephrased as a processor.

The hardware resource 400 may include hardware (for example, an input-output interface) which is not illustrated. The number of units such as the arithmetic unit 401 which are included in an apparatus is not intended to be limited to the example in FIG. 10, but a plurality of arithmetic units 401 may be included in the apparatus, for example. As the arithmetic unit 401, for example, a CPU (central processing unit), an MPU (micro-processor unit), or the like can be used.

As the memory 402, for example, a RAM (random access memory), a ROM (read-only memory), an HDD (hard disk drive), an SSD (solid state drive), or the like can be used.

As the network interface 403, for example, a LAN (local area network) card, a network adapter, a network interface card, or the like can be used.

In the example in FIG. 10, the memory 402 is used for storing a software module group. The arithmetic unit 401 reads out the software module group from the memory 402, executes the software module group, and can thereby perform processes for the information processing apparatus 20 and so forth which are described in the above-described example embodiments.

As described by using FIG. 10, each of the arithmetic units 401 provided to the information processing apparatus 20 and so forth in the above-described example embodiments executes one or plural programs including a command group for causing a computer to perform the algorithms described by using the drawings.

In the above-described examples, the program can be stored by using various types of non-transitory computer-readable media and can be supplied to the computer. The non-transitory computer readable media include various types of tangible storage media. Examples of the non-transitory computer-readable media include magnetic recording media (for example, a flexible disc, a magnetic tape, and a hard disk drive), magneto-optical recording media (for example, a magneto-optical disk), a CD-ROM (read-only memory), a CD-R, a CD-R/W, and semiconductor memories (for example, a mask ROM, a PROM (programmable ROM), an EPROM (erasable PROM), a flash ROM, and a RAM (random access memory)). Further, the program may be supplied to the computer by using various types of transitory computer-readable media. Examples of the transitory computer-readable media may include an electric signal, an optical signal, and an electromagnetic wave. The transitory computer-readable media can supply the program to the computer via a wired communication path such as an electric wire or an optical fiber or a wireless communication path.

Note that the present disclosure is not limited to the above example embodiments but can appropriately be modified without departing from the scope of the gist thereof.

A part or all of the above example embodiments can be described as the following supplementary notes but are not limited to the following.

(Supplementary Note 1)

An information processing apparatus including:

an extraction unit configured to extract at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region;

an estimation unit configured to estimate a first photographing orientation of the first photographing apparatus, the first photographing apparatus photographing the first photographed image which is extracted, and a second photographing orientation of the second photographing apparatus at a time when the second photographed image is photographed; and a control unit configured to control an action of the moving apparatus based on the first photographing orientation and the second photographing orientation.

(Supplementary Note 2)

The information processing apparatus described in the supplementary note 1, in which the control unit changes a speed of the moving apparatus based on the first photographing orientation and the second photographing orientation.

(Supplementary Note 3)

The information processing apparatus described in the supplementary note 1 or 2, in which the first photographing orientation is a first angle of a photographing direction of the first photographing apparatus with respect to a specific direction, and the second photographing orientation is a second angle of a photographing direction of the second photographing apparatus with respect to the specific direction, and the control unit decreases a speed of the moving apparatus in a case where a difference between the first angle and the second angle is greater than a threshold value defined in advance.

(Supplementary Note 4)

The information processing apparatus described in the supplementary note 3, in which the control unit increases the speed of the moving apparatus in a case where the difference between the first angle and the second angle is smaller than a threshold value defined in advance.

(Supplementary Note 5)

The information processing apparatus described in the supplementary note 1 or 2, in which the first photographing orientation is a first photographing direction of the first photographing apparatus, and the second photographing orientation is a second photographing direction of the second photographing apparatus, and the control unit decreases a speed of the moving apparatus in a case where an angle which is formed between the first photographing direction and the second photographing direction is greater than a threshold value defined in advance.

(Supplementary Note 6)

The information processing apparatus described in the supplementary note 5, in which the control unit increases the speed of the moving apparatus in a case where the angle which is formed between the first photographing direction and the second photographing direction is smaller than a threshold value defined in advance.

(Supplementary Note 7)

The information processing apparatus described in any one of the supplementary notes 1 to 6, in which the three-dimensional image is generated by using SfM (structure from motion).

(Supplementary Note 8)

A moving body control system including:

a moving apparatus configured to autonomously move in a predetermined region; and a remote control apparatus having an extraction unit configured to extract at least one first photographed image, the first photographed image being similar to a second photographed image which is photographed by using a second photographing apparatus mounted on the moving apparatus, the moving apparatus being moving in the predetermined region, from a plurality of first photographed images which are photographed by using a first photographing apparatus for creating a three-dimensional image of the predetermined region, an estimation unit configured to estimate a first photographing orientation of the first photographing apparatus, the first photographing apparatus photographing the first photographed image which is extracted, and a second photographing orientation of the second photographing apparatus at a time when the second photographed image is photographed, and a control unit configured to decide an action of the moving apparatus based on the first photographing orientation and the second photographing orientation, in which the moving apparatus acts based on an action instruction which is obtained from the remote control apparatus via a network.

(Supplementary Note 9)

The moving body control system described in the supplementary note 8, in which the control unit changes a speed of the moving apparatus based on the first photographing orientation and the second photographing orientation.

(Supplementary Note 10)

A control method executed in an information processing apparatus, the control method including:

extracting at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region;

estimating a first photographing orientation of the first photographing apparatus, the first photographing apparatus photographing the first photographed image which is extracted, and a second photographing orientation of the second photographing apparatus at a time when the second photographed image is photographed; and controlling an action of the moving apparatus based on the first photographing orientation and the second photographing orientation.

(Supplementary Note 11)

A program causing a computer to execute:

extracting at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region;

estimating a first photographing orientation of the first photographing apparatus, the first photographing apparatus photographing the first photographed image which is extracted, and a second photographing orientation of the second photographing apparatus at a time when the second photographed image is photographed; and controlling an action of the moving apparatus based on the first photographing orientation and the second photographing orientation.

REFERENCE SIGNS LIST

10 INFORMATION PROCESSING APPARATUS
11 EXTRACTION UNIT
12 ESTIMATION UNIT
13 CONTROL UNIT
20 INFORMATION PROCESSING APPARATUS
21 ORIENTATION DIFFERENCE CALCULATION UNIT
22 ENVIRONMENTAL MAP STORAGE UNIT
23 ROUTE PLAN STORAGE UNIT
30 MOVING ROBOT
31 PHOTOGRAPHING APPARATUS
32 DRIVING UNIT
41 PHOTOGRAPHING SPOT
42 PHOTOGRAPHING DIRECTION
43 VIEWING ANGLE
51 PHOTOGRAPHING SPOT
52 PHOTOGRAPHING DIRECTION
53 VIEWING ANGLE

61 REFERENCE LINE
101 REMOTE CONTROL APPARATUS
102 NETWORK
103 IMAGE-CAPTURING APPARATUS
104 MOVING BODY
201 MOVING BODY CONTROL UNIT
202 COMMUNICATION UNIT
301 COMMUNICATION UNIT
302 DRIVE CONTROL UNIT
303 DRIVING UNIT
400 HARDWARE RESOURCE
401 ARITHMETIC UNIT
402 MEMORY
403 NETWORK INTERFACE
404 INTERNAL BUS

What is claimed is:

1. An information processing apparatus comprising:

at least one memory storing instructions, and at least one processor configured to execute the instructions to;

extract at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region;

estimate a first photographing orientation of the first photographing apparatus, the first photographing apparatus photographing the first photographed image which is extracted, and a second photographing orientation of the second photographing apparatus at a time when the second photographed image is photographed; and control an action of the moving apparatus based on the first photographing orientation and the second photographing orientation, wherein the first photographing orientation is a first angle of a photographing direction of the first photographing apparatus with respect to a specific direction, and the second photographing orientation is a second angle of a photographing direction of the second photographing apparatus with respect to the specific direction, and the at least one processor is further configured to execute the instructions to decrease a speed of the moving apparatus in a case where a difference between the first angle and the second angle is greater than a threshold value defined in advance.

2. The information processing apparatus according to claim 1, wherein the at least one processor is further configured to execute the instructions to change a speed of the moving apparatus based on the first photographing orientation and the second photographing orientation.

3. The information processing apparatus according to claim 1, wherein the at least one processor is further configured to execute the instructions to increase the speed of the moving apparatus in a case where the difference between the first angle and the second angle is smaller than a threshold value defined in advance.

4. The information processing apparatus according to claim 1, wherein the three-dimensional image is generated by using SfM (structure from motion).

5. A control method executed in an information processing apparatus, the control method comprising:

extracting at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region;

estimating a first photographing orientation of the first photographing apparatus, the first photographing apparatus photographing the first photographed image which is extracted, and a second photographing orientation of the second photographing apparatus at a time when the second photographed image is photographed; and controlling an action of the moving apparatus based on the first photographing orientation and the second photographing orientation, wherein the first photographing orientation is a first angle of a photographing direction of the first photographing apparatus with respect to a specific direction, and the second photographing orientation is a second angle of a photographing direction of the second photographing apparatus with respect to the specific direction, and in controlling the action of the moving apparatus, a speed of the moving apparatus is decreased in a case where a difference between the first angle and the second angle is greater than a threshold value defined in advance.

6. A non-transitory computer-readable medium storing a program, the program causing a computer to execute:

extracting at least one first photographed image, the first photographed image being similar to a second photographed image which is photographed by using a second photographing apparatus mounted on a moving apparatus, the moving apparatus being moving in a predetermined region, from a plurality of first photographed images which are photographed by using a first photographing apparatus for creating a three-dimensional image of the predetermined region;

estimating a first photographing orientation of the first photographing apparatus, the first photographing apparatus photographing the first photographed image which is extracted, and a second photographing orientation of the second photographing apparatus at a time when the second photographed image is photographed; and controlling an action of the moving apparatus based on the first photographing orientation and the second photographing orientation, wherein the first photographing orientation is a first angle of a photographing direction of the first photographing apparatus with respect to a specific direction, and the second photographing orientation is a second angle of a photographing direction of the second photographing apparatus with respect to the specific direction, and in controlling the action of the moving apparatus, a speed of the moving apparatus is decreased in a case where a difference between the first angle and the second angle is greater than a threshold value defined in advance.

* * * * *